May 20, 1930. J. T. PEARSON ET AL 1,759,365
ADAPTER MEMBER FOR CONDUIT OUTLET BOXES
Filed Jan. 26, 1926 2 Sheets-Sheet 1

INVENTORS;
John T. Pearson, Raymond H. Olley
BY
Parsons & Bodell
ATTORNEYS.

May 20, 1930. J. T. PEARSON ET AL 1,759,365
ADAPTER MEMBER FOR CONDUIT OUTLET BOXES
Filed Jan. 26, 1926 2 Sheets-Sheet 2
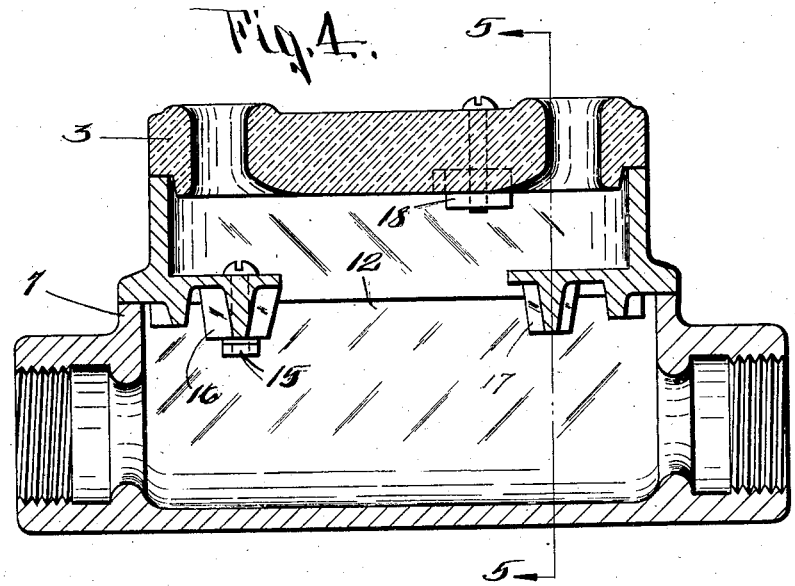
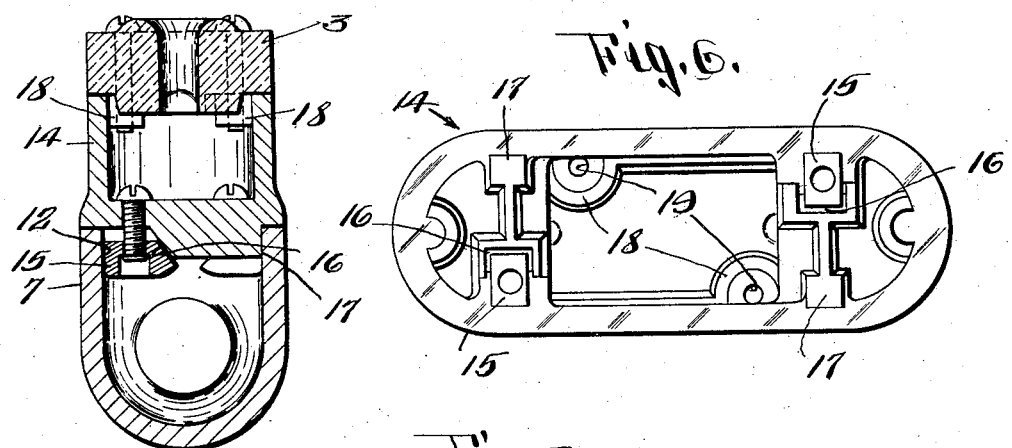
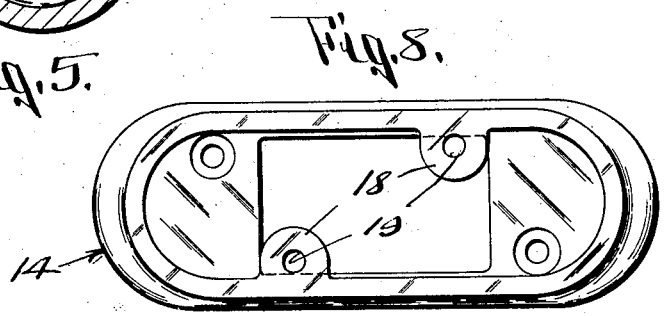
INVENTORS
John T. Pearson and Raymond H. Alley
BY
Parsons & Bodell
ATTORNEYS.

Patented May 20, 1930

1,759,365

UNITED STATES PATENT OFFICE

JOHN T. PEARSON AND RAYMOND H. OLLEY, OF SYRACUSE, NEW YORK, ASSIGNORS TO CROUSE-HINDS COMPANY, OF SYRACUSE, NEW YORK, A CORPORATION OF NEW YORK

ADAPTER MEMBER FOR CONDUIT OUTLET BOXES

Application filed January 26, 1926. Serial No. 83,820.

This invention has for its object a particularly simple and efficient adapter for conduit outlet boxes by which covers or appliances adapted to be applied to the open sides of conduit outlet boxes of the type having internal lugs can be applied to conduit outlet boxes of the type unprovided with lugs and having the inner walls along their open sides unobstructed, and also whereby covers or appliances adapted to be secured to conduit outlet boxes of the second type can be applied to conduit outlet boxes of the first type, which adapting means is particularly simple and economical in construction and highly efficient and durable in use.

The invention consists in the novel features and in the combinations and constructions hereinafter set forth and claimed.

In describing this invention reference is had to the accompanying drawings in which like characters represent corresponding parts in all the views.

Figure 4 is a view similar to Figure 1 of a conduit outlet box and adapting means by which the conduit outlet boxes of the second type are adapted to receive the covers or appliances for boxes of the first class.

Figure 5 is the sectional view on line 5—5, Figure 4.

Figure 6 is a bottom plan view of the adapter shown in Figures 4 and 5.

Figures 7 and 8 are plan views of the two types of boxes.

Figure 1:
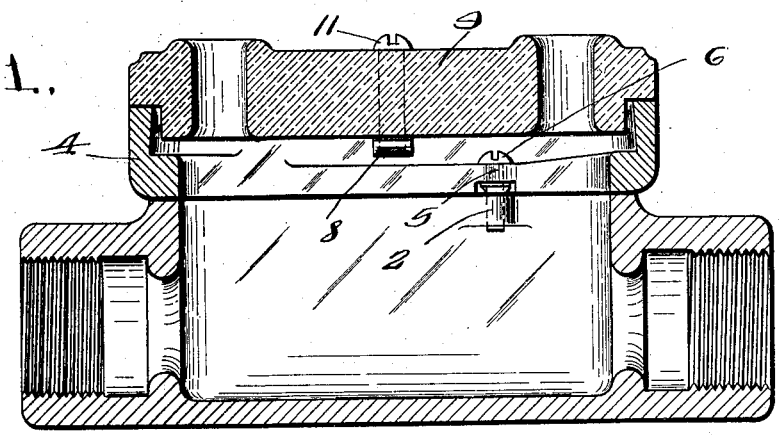
Figure 1 is a longitudinal sectional view of a conduit outlet box of the first type provided with my adapting means for covers or appliances for boxes of the second type.
Figure 2:
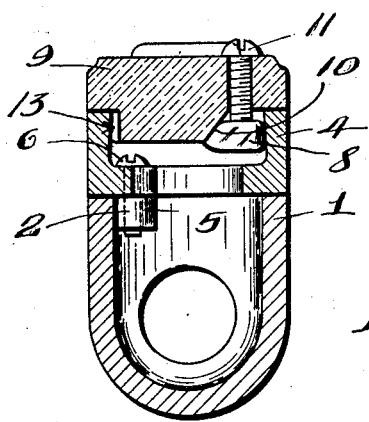
Figure 2 is a cross sectional view on line 2—2, Figure 1.
Figure 3:
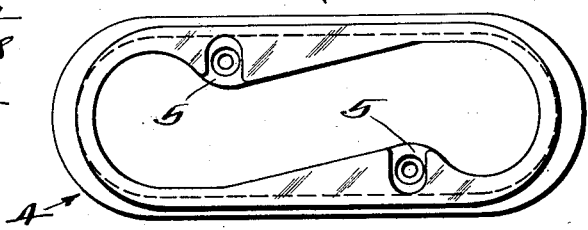
Figure 3 is a bottom plan view of the adapter seen in Figures 1 and 2.

As will be understood by those skilled in the art, conduit outlet boxes, known to the trade as condulets, may be classified generally as two types. In one of these types the opening at the open side of the box is provided with internal lugs for receiving the fastening screws of appliances or covers attachable to such box. In the other of these classes the open side of the box is unprovided with lugs, and the inner walls around such open side are smooth and unobstructed and adapted to receive the fastening means of covers and appliances such as set forth in our Patent No. 1,525,689, issued February 10, 1925.

This invention comprises an adapter member having openings in different sides conforming respectively to the openings of the conduit outlet boxes of said types, and provided on one side with means securable to the open side of the boxes of one of said two types, and having its opening on its other side formed to receive the fastening means of the covers of appliances attachable to boxes of the other of said two types.

1 designates the box of the type having an opening in one side and internal lugs 2 projecting into the opening for receiving the fastening screws of appliances or covers as 3, Figure 4, adapted to be secured to the open sides of such boxes provided with lugs.

4 is one adapter which is in the form of an oblong box open on different sides as its upper and lower sides or top and bottom, it being provided on its lower side with suitable means as lugs 5 corresponding to the lugs 2 of the box, which receive the fastening screws 6, which fastening screws thread into the lugs 2 of the box in the same manner that the fastening screws of the covers 3, Figure 5, thread into the lugs 2 of the box.

The other side of this adapter is smooth and unobstructed for receiving the fastening means of covers and appliances for boxes 7 of the second type, the form of which fastening means is shown in our patent before referred to.

This fastening means consists generally of one or more wedges or nuts 8 on the inner side of the cover 9 for coacting inclined plane fashion with a projection 10 on the inner side of the cover, and a screw 11 extending through the cover and threading into the nut 8 so that when the screw is tightened the nut is projected or wedged laterally and thrusts against the smooth wall on one side of the opening 12 of the box 7 and thrusts a shoulder 12, on the opposite side of the cover against the inner face of the opposite wall of the box 7.

14 designates an adapter in the form of a box having openings on opposite sides thereof, the opening on one side being provided with fastening means similar to that described in our patent before referred to, consisting of a pair of nuts 15 coacting with fixed projections 16, to wedge laterally against shoulders 17, the nuts and shoulders being arranged to clamp against the inner faces of opposite sides of the boxes of the type unprovided with lugs, and the screws for operating the nuts being operable through the upper or open side of the adapter box 14. The upper or open side of the adapter box is provided with lugs 18 formed with threaded holes 19 for receiving the fastening screws of covers or appliances adapted to fit openings of boxes of the first class, that is the type provided with lugs.

Figure 7:
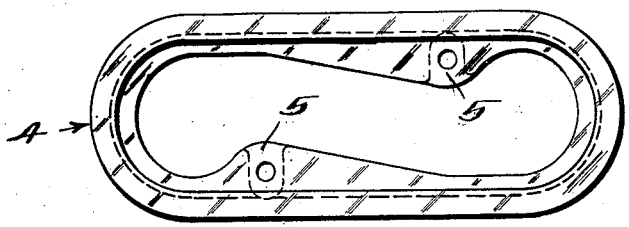

Either form of adapter member 4 or 14 consists of a box having openings in opposite or different sides conforming to the cover openings of the types of boxes shown in Figures 7 and 8, and either form has internal lugs in one of said openings corresponding to the lugs of the box shown in Figure 7, and has its other side formed without lugs.

Obviously regardless of what type of boxes or type of covers or appliances a contractor may have, he can make use of them by selecting the proper adapting means so that with a small number of the adapters on hand, a contractor can readily make use of either kind of boxes or appliances or covers he may have on hand. Thus a contractor or dealer does not have to carry a large stock of both types of boxes and covers, but can fill all requirements with a small stock of each type and a small supply of adapters.

What we claim is:—

1. An adapter member for attaching appliances for one of two types of conduit outlet boxes as specified to the other of said type, both of said types having oblong openings, said adapter having oblong openings in different sides thereof corresponding to the oblong openings of the boxes, the adapter member having means on one open side for attachment to the open side of the boxes of one type in place of the appliances for such type, the adapter member having its other open side formed to receive the oblong appliances for boxes of said other type.

2. An adapter member for attaching appliances for one of two types of conduit outlet boxes as specified to the other of said type, both types having oblong openings, one type having lugs extending into said opening and the other type being unprovided with lugs, the adapter member being in the form of a box having oblong openings in different walls thereof corresponding to the oblong openings in the walls of the two types of boxes, the adapter member being provided with internal lugs projecting into the opening in one of its sides and conforming to the lugs of one of the two types of boxes and the adapter member being unprovided with lugs in its other opening.

3. An adapter member for attaching appliances for one of two types of conduit outlet boxes to the other of said types, the boxes of both types being provided with oblong openings and one of said types being provided with internal lugs in the openings and the other being unprovided with such lugs, the adapter member being in the form of a box having oblong openings in different sides thereof conforming respectively to the openings of the boxes of said type, the adapter box having means on one of said sides for attachment to the boxes of one of said two types in place of the appliance adapted for that type, the opening on its other side being formed to receive the fastening member of the appliances for boxes of the other of said two types.

4. The combination with a conduit outlet box of the type having an oblong opening and internal lugs by which an appliance is secured to the open side of the box and a conduit outlet box of the type having an oblong opening unprovided with internal lugs and having the inner walls along its open side unobstructed for receiving the fastening means of appliances mountable on such unobstructed side, of an adapter member having oblong openings in different sides thereof conforming respectively to the openings of the boxes of said types and provided with means on one side for securement to the open sides of the boxes of one of said types and having its opening on its other side formed to receive the fastening means of the appliances attachable to boxes of the other of said types.

In testimony whereof, we have hereunto signed our names, at Syracuse, in the county of Onondaga, and State of New York, this 7th day of January, 1926.

JOHN T. PEARSON.
RAYMOND H. OLLEY.